March 11, 1947.  P. C. GROSE  2,417,358
AIRCRAFT UTILIZING MAGNUS EFFECT
Filed Aug. 3, 1942  2 Sheets-Sheet 1

Inventor
Parlee C. Grose
By Wilfred E. Lawson
Attorney

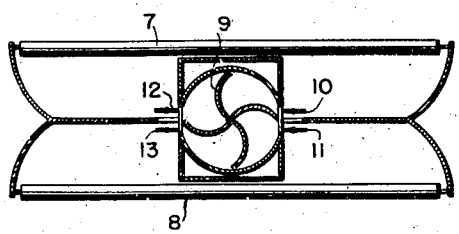
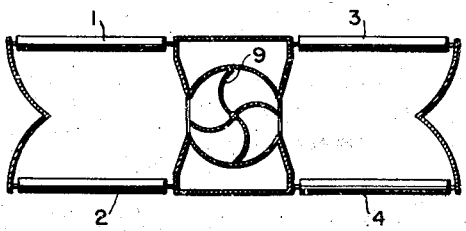
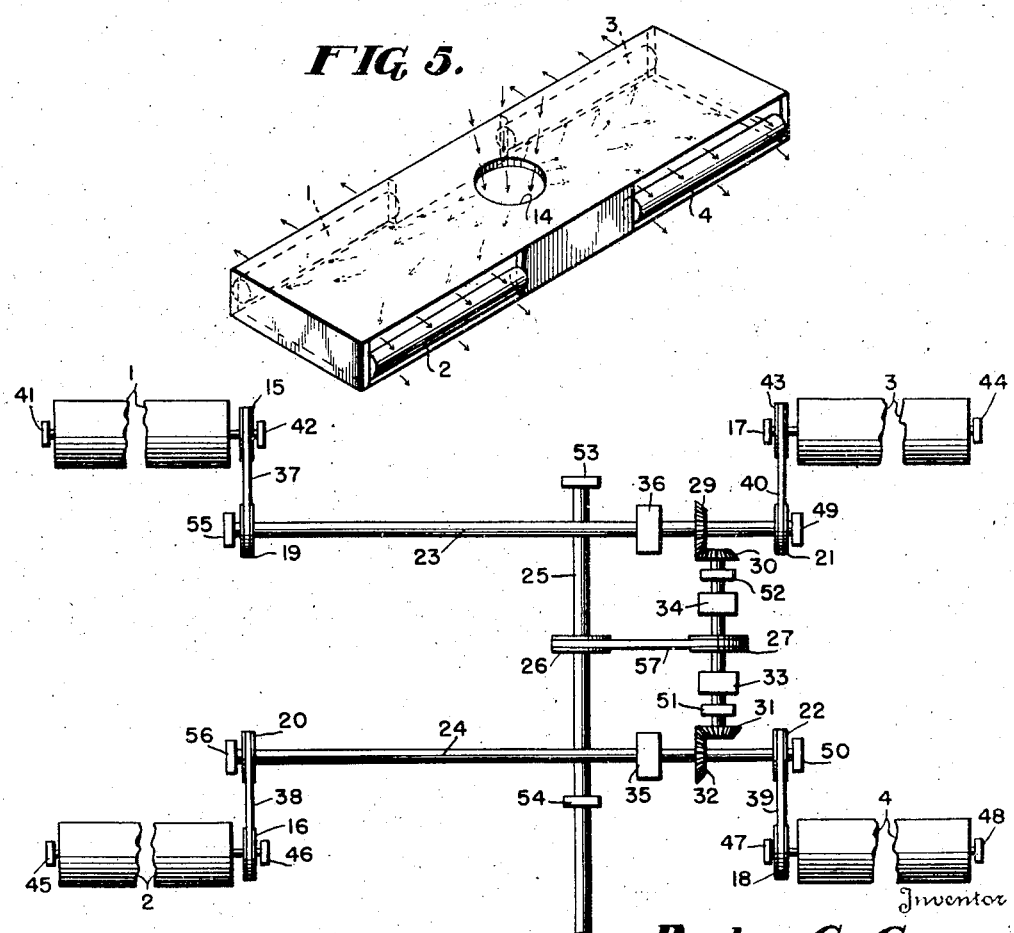

Patented Mar. 11, 1947

2,417,358

UNITED STATES PATENT OFFICE 2,417,358

AIRCRAFT UTILIZING MAGNUS EFFECT

Parlee C. Grose, McComb, Ohio

Application August 3, 1942, Serial No. 453,389

5 Claims. (Cl. 244—10)

My invention relates to aircraft, and has for its object the accomplishment of vertical ascent and descent as well as horizontal flight. My invention admits of a utility primarily as a helicopter, or it admits of a utility in which it merely adds its ascent and descent features to the conventional aeroplane.

My invention is based on the Magnus effect, that aerodynamic principle in which a cylinder rotating at high speed in an air stream produces exceptionally high lift values. In an aircraft the lift values of the Magnus effect can be achieved in either of two ways: the rotating cylinder can be moved at high speed through the air, thereby providing a flow of air around the cylinder; or the aircraft itself can embody provision for inducing a flow of air around the cylinder, even when the craft is stationary relative to the surrounding air proper. It is the latter of these two methods that I use in my invention.

In addition to the power plant and the propeller or propellers commonly used for horizontal or gliding movement, an aircraft embodying my invention will possess: two or more cylinders suitably disposed in relation to the three aerodynamic axes of an aircraft, an impeller or air-compression unit for producing an induced flow of air around the cylinders, an air chamber and passages for directing and regulating the flow of air from the impeller or compression unit to the cylinders, and suitable power transmission mechanism enabling the power plant to drive the impeller or compression unit and the cylinders.

An aircraft embodying my invention when used strictly as a helicopter will achieve ascent, descent and sustentation solely by the lift value of the Magnus effect, the cylinders and the impeller or air-compression elements being continuously activated by the power plant, while the propellers for horizontal propulsion after ascent has been attained should admit of variable or discontinuous thrust. An aircraft embodying my invention when used mainly as an aeroplane with my invention serving merely as an improvement for more efficient ascent and descent, uses power from its power plant to activate the cylindrical rotors and the air impeller or air-compression elements only during ascent or descent, the air impeller or air-compression elements being disconnected from the power plant when the horizontal movement of the craft is of sufficient speed to provide adequate lift from its fixed plane surfaces.

A craft free to move in an air medium possesses three aerodynamic axes, the vertical, longitudinal and transverse. My invention consists in so disposing one or more pairs of cyindrical rotors and two or more variable-pitch propellers in relation to an aircraft's aerodynamic axes that control of the craft is attainable in ascent, descent and horizontal flight.

I refer to accompanying drawings to further illustrate my invention. The same reference characters indicate the same parts in all the views. When hereafter the word "rotor" is used it will signify a cylinder that may be rotated in an air stream to obtain the lift values of the Magnus effect. When the word "impeller" is used it will signify means for inducing a difference of air pressure and setting up an air flow.

Fig. 3 is a diagrammatic plan view illustrating possible employment of but a single pair of rotors and a possible means of control in such employment.

Fig. 4 is a diagrammatic plan view illustrating possible arrangement of rotors relative to impeller where two pairs of rotors are employed.

Fig. 5 is a diagrammatic perspective view illustrating an impeller-induced flow of air into an air chamber and out over the upper surfaces of two pairs of rotating rotors.

Fig. 6 is a plan view of possible means for governing variable speeds of rotation of certain rotors in relation to the speeds of rotation of other rotors in a four-rotor system.

Figure 1:
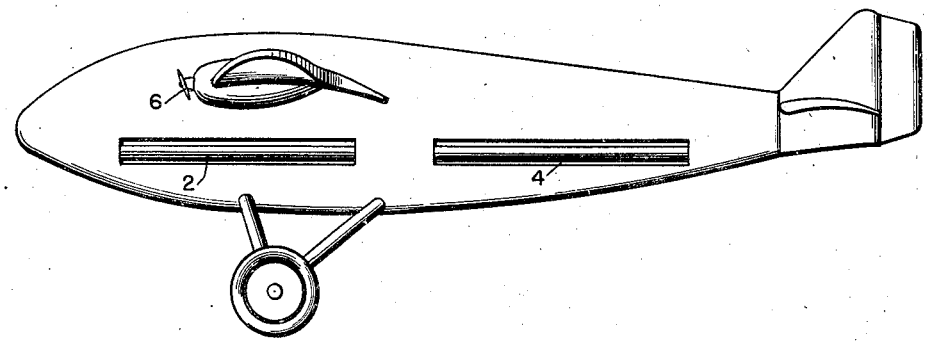
Fig. 1 is a side view of an aircraft showing possible placement of rotors relative to the craft's transverse axis, and also illustrating possible placement of rotors in the side walls of a fuselage.

It is shown in Fig. 1 that such longitudinal placement of rotors should present no great head resistance in horizontal flight.

Figure 2:
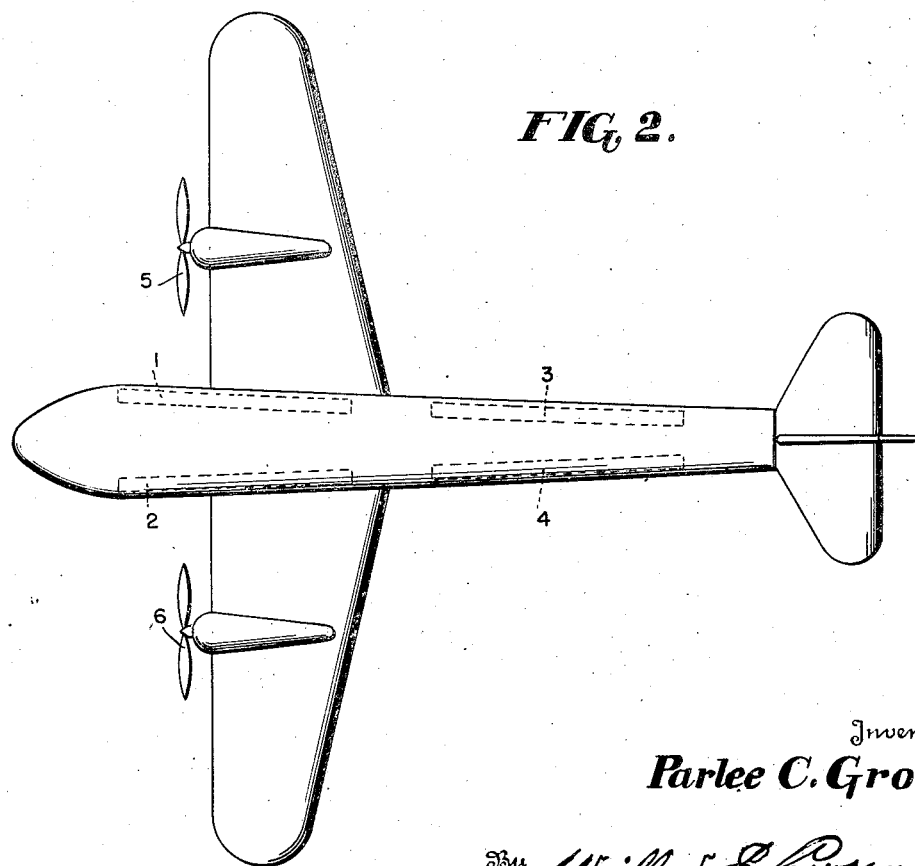
Fig. 2 is a plan view of an aircraft showing possible placement of rotors, where two pairs of such rotors are employed, relative to the craft's transverse and longitudinal axes.

In Fig. 2 it is further shown that the lift values of rotors 1 and 2 are effective forward or preponderantly forward, and the lift values of rotors 3 and 4 are effective to the rear, of the craft's transverse axis. Also it is shown that rotors 1 and 3 lie on one side, and rotors 2 and 4 lie on the opposite side, of the craft's longitudinal axis. It is also shown that the two variable-pitch propellers 5 and 6 are laterally disposed on opposite sides of the craft's longitudinal axis.

It is therefore manifest that such a system affords and embraces basic features relative to the craft's three aerodynamic axes. Varying the pitch of propeller 5 in relation to the pitch of propeller 6 will influence the craft's movement about its vertical axis; varying the lift value of the pair of rotors 1 and 2 in relation to the lift value of the pair of rotors 3 and 4 will influence the craft's movement about its transverse axis. Varying the lift value of the pair of rotors 1 and 3 relative to the lift value of the pair of rotors 2 and 4 will influence the craft's movement about its longitudinal axis.

The lift value of a rotor operating in a translational air flow is subject to two variable factors: the velocity of the translational flow and the peripheral velocity of the rotating rotor. It is obvious, therefore, that two methods are available for altering the lift value of a rotor: One method is to alter the velocity of the air stream; the other is to alter the rotor's speed of rotation. As means adaptable to the functioning of my system, I illustrate a possible application of each of the two methods.

In Fig. 3 two rotors 7 and 8 are shown, each of which extends both forward and aft of the craft's transverse axis and lies laterally disposed and substantially parallel to the craft's longitudinal axis. The impeller 9 forces a stream of air into the four-compartment air chamber from which it escapes by passing across rotors 7 and 8. From the impeller the air flow enters the compartments of the air chamber through valve gates 10, 11, 12 and 13. Closing or partially closing one of these valve gates will decrease the pressure and air flow within its respective compartment. Altering valve gates 10 and 11 in relation to valve gates 12 and 13 will thus alter the rotor lift values forward and aft of the craft's transverse axis; and altering valve gates 10 and 12 in relation to valve gates 11 and 13 will alter the lift value of rotor 7 in relation to the lift value of rotor 8. Means are available, it is therefore evident, to influence the craft's movements around its transverse and longitudinal axes by regulating the impelled flow of air.

A simple system of cord and pulleys leading to the pilot's seat from the several valve gates will afford pilot manual control.

Fig. 3 also illustrates how a system of only one pair of rotors can function where the method of control is that of regulating the impelled flow of air.

The other method of control, that of altering rotor lift values by increasing or decreasing the peripheral speed of one pair of rotors in relation to the peripheral speed of another pair of rotors, is practicable in a system of four rotors. Fig. 4 and Fig. 5 give further illustration of possible means for providing impelled air flow to the several rotors. Air entering the impeller at 14 and flowing through the air chamber acts upon the several rotors at substantially the same pressure of flow. If, in an air stream of a given velocity, the rotational speed of rotors 1 and 2 is altered in relation to the rotational speed of rotors 3 and 4, there will arise a difference in lift values between the two pairs of rotors, which force will influence movement of the craft around its transverse axis; likewise if the rotational speed of rotors 1 and 3 is altered in relation to the rotational speed of rotors 2 and 4, there will arise a difference in lift values between the two pairs of rotors, which force will influence movement of the craft around its longitudinal axis.

A possible means of altering and regulating the rotational speed of one pair of rotors in relation to the rotational speed of another pair of rotors in my system, is illustrated in Fig. 6, a partial plan view. Rotors 1, 2, 3 and 4 are shown in their supporting bearings 41, 42, 17, 44, 45, 46, 47, and 48, and are provided with driving pulleys 15, 16, 43 and 18. Shafts 23, 24, 25 and 28 are shown in their supporting bearings 49, 50, 51, 52, 53, 54, 55 and 56. Shaft 25 connects by clutch with power plant. Through pulleys 26 and 27 and belt 57 it drives shaft 28, which through gears 29, 30, 31 and 32 transmits motion to shafts 23 and 24, which through pulleys 19, 20, 21 and 22 and belts 37, 38, 39 and 40 transmit motion to the four rotors 1, 2, 3, and 4. Elements 33, 34, 35 and 36 on the shafts 23, 24 and 28 are variable speed shaft-in-line units installed upon their respective shafts. By activating the speed-changing controls of units 35 and 36 in unison the rotational speed of rotors 1 and 2 is altered in relation to the rotational speed of rotors 3 and 4; by activating the speed-changing control of either one of units 33 or 34 alone, or by activating their controls both at once oppositvely, the rotational speed of rotors 1 and 3 is altered in relation to the rotational speed of rotors 2 and 4.

A simple system of cord and pulleys leading to the pilot's seat from the speed-changing controls of units 33, 34, 35 and 36 will afford pilot manual control.

The means illustrated in Fig. 6 applies only to control of the rotational speeds of the several rotors. It is obvious, however, that the drive shaft 25 leading to power plant could also transmit power to and activate an impeller.

With my invention embodied in a conventional type of aeroplane, the manner of ascent, horizontal flight and descent would be substantially as follows: With the craft grounded ready to ascend, the propellers would be set at zero pitch and the clutch engaged connecting the power plant with the transmission mechanism leading to the impeller and rotors. During ascent the full capacity of the power plant would be available in transmitting power to the impeller and rotors. Off the ground and free to movement around its three aerodynamic axes, the craft would be subject to the pilot's control through the means I have hereinbefore set forth. If in case of a wind the craft should tend to drift while rising, a slight alteration from zero pitch in one of the propellers would turn the craft until headed into the wind after which the pitch of both propellers could be regulated to deliver the thrust needed to hold the craft to its vertical course. The desired height being attained, the pitch of both propellers would be increased and horizontal flight would begin. As the craft's horizontal speed of flight increased its fixed plane surfaces would build up lift and the power plant could be disconnected from the rotors and impeller, leaving the full capacity of the power plant available for horizontal flight. In descent the procedure would be substantially reversed.

With my invention embodied in a conventional type of aeroplane it should be possible to place the impeller, air chamber and rotors in the lower levels of the fuselage, with a limited upper space being devoted to an air passage or passages for the impeller intake.

It is readily apparent, therefore, that my invention, while being basically a helicopter, may well lend itself as an improvement in more conventional types of aircraft.

Having thus explained my invention and shown possible means for giving it functional and practical application,

What I claim is:

1. In an airplane, including a fuselage, means providing an air chamber, cylindrical rotors supported at opposite sides of the fuselage for rotation on axes extending longitudinally thereof and so disposed as to exercise a lift value when rotated both forward and aft of the crafts aerodynamic transverse axis and on either side of its aerodynamic longitudinal axis, said air chamber having outlets in each of which a rotor is positioned, blower means for forcing air into the chamber for discharge through the outlets across the rotors, means for applying rotary motion to the rotors, and means for altering and controlling the Magnus effect lift values of said rotors.

2. An airplane structure as set forth in claim 1, in which the last means comprises structure dividing said chamber in four compartments, each compartment supplying air to a rotor on one side of the craft and means for selectively directing the flow of air from the blower means into the compartments.

3. An airplane construction as set forth in claim 1, wherein the last means includes a division of the air chamber in four compartments, by the disposition of the blower means midway between the ends of the chamber and a dividing wall extending from each of two sides of the blower means to the adjacent end of the chamber, the blower means discharging air through the two said opposite sides toward the two ends of the chamber and into each of the four compartments for discharge therefrom across the adjacent rotors and valve elements arranged for controlling the discharge of air by the blower means into the four compartments whereby the air flow into the compartments may be selectively controlled.

4. An airplane construction as stated in claim 1, in which the last means comprises in association with a power plant, a power shaft, a countershaft, a driving connection between each end of the countershaft and a rotor cylinder, and apparatus in line with the countershaft for changing the rotary speed transmitted from each end of the countershaft to the cylinder connected with each end.

5. An airplane construction of the character stated in claim 1, in which the cylindrical rotors are divided in two pairs, there being a pair at each side of the fuselage in spaced axial alinement, and the last means comprises in association with a power means, a shaft connected between the two cylinders of each pair, a speed change mechanism in line in each shaft, a countershaft disposed between and operatively coupled with the shafts connecting the pairs of cylinders, a driving connection between the power means and the countershaft, and a speed change mechanism in the countershaft upon each side of the driving connection between the countershaft and the power means.

PARLEE C. GROSE.

REFERENCES CITED

The following references are of record in the file of this patent:

UNITED STATES PATENTS

| Number | Name | Date |
|---|---|---|
| 1,278,750 | Romualdi | Sept. 10, 1918 |
| 2,050,903 | Topliff | Aug. 11, 1936 |
| 2,280,654 | Mader | Apr. 21, 1942 |
| 1,304,187 | Lind | May 20, 1919 |

FOREIGN PATENTS

| Number | Country | Date |
|---|---|---|
| 371,691 | Britain | Apr. 28, 1932 |
| 637,289 | France | Jan. 28, 1928 |